2,838,363

METHOD OF PREPARING FILAMENTS AND SHEETS FROM PROCOLLAGEN

Arthur Veis and Jerome Cohen, Chicago, Ill., assignors to Armour and Company, Chicago, Ill., a corporation of Illinois No Drawing. Application October 19, 1954
Serial No. 463,332

7 Claims. (Cl. 18—54)

This invention relates to a method of producing a material of relatively high wet strength from procollagen, and more particularly to a method of preparing filaments and sheets from procollagen. It also relates to the products obtained by said method.

A distinction has been recognized for a number of years between two types of collagen, one type being soluble in aqueous acid solutions and the other type being insoluble therein. In this application the term "collagen" will be used to designate the type of collagen which is insoluble in aqueous acid solutions, while the term "procollagen" will be used to designate the acid-soluble or acid-extract collagen. This terminology is substantially in accordance with the generally accepted meaning of these terms.

It has been known for some time that procollagen could be formed into a gel by dissolving it in aqueous acid, and then dialyzing the acid solution against water, and a buffered aqueous acid solution has usually been employed for this purpose. The gels thus obtained, however, have not heretofore been found to possess any practical utility, principally because of their very low cohesive strength. It has been recognized, though, that it would be desirable to provide a means for preparing a material of relatively high wet strength from such procollagen gels, and particularly a material in the form of filaments or sheets.

It is, therefore, a general object of this invention to provide a means for producing a material of relatively high wet strength from procollagen, and for forming the material into filaments or sheets. A more specific object is to provide a method for converting a procollagen gel of low cohesive strength into a material having a sufficiently high wet strength to make it of practical value. Further objects and advantages will appear as the specification proceeds.

In one of its aspects, the method of this invention comprises converting an aqueous acid solution of procollagen to a gel by dialyzing said solution against water, the dialysis being carried out at a rate slow enough to form an isotropic gel having a substantially homogeneous appearance to the naked eye. The isotropic gel is then aged in water to increase its cohesive strength, and thereafter an orienting stress is applied to the aged gel while exuding water therefrom. In this way, depending on the type of orienting stress employed, filaments and sheets of high wet strength can be prepared from procollagen.

In practicing the method of this invention, the aqueous acid solution of procollagen can be prepared substantially in accordance with the prior-art methods of preparing such solutions which could be gelled by dialyzing the solutions against water. For example, a collagenous source material can be extracted with a buffered aqueous acid solution to obtain an extract of procollagen, as described by Highberger, Gross and Schmitt, J. Am. Chem. Soc. 72, 3321 (1950), or Orekhovich, et al., Biokhimiya, 13, 55–60 (1948). However, it is preferred to employ the following procedure.

Starting with a collagen-containing animal material, such as pork skins or beef hide, the globular proteins and albumins are first extracted and largely removed by washing the collagen-containing material with cold 10% aqueous sodium chloride until the wash liquid is clear and free from proteinaceous material. Lipoidal matter or fat is then removed by extracting the collagen-bearing material with a fat solvent, such as ethyl ether or other suitable organic solvent. The remaining material will be almost entirely collagen and procollagen.

The material containing the collagen and procollagen is extracted with an aqueous acid solution, preferably at a pH from 3 to 4, and in the presence of a buffer. The organic acids like citric, malonic, and acetic acids are particularly suitable, as are the phosphate buffers such as sodium dihydrogen phosphate, although other acids and buffers can be used. The extract or supernatant containing the procollagen can be separated from the collagen residue by filtration or centrifugation. The clarified extract thus obtained provides the starting material for the method of this invention.

When working with fresh steer hides or pork skins, it has been found to be desirable to keep the material frozen prior to the preparation of the procollagen extract therefrom, and in fact repeated freezing and thawing is advantageous in increasing the yield of procollagen. Further, temperatures of from 5 to 10° C. are desirable during the processing of the collagen and procollagen-bearing material, although somewhat higher temperatures can be used without detrimental results.

In accordance with the method of this invention, an aqueous acid solution of procollagen, which is preferably obtained in the manner just described, is converted to a gel by dialyzing the solution against water. In this dialysis it is important for achieving applicants' results that the dialysis be carried out at a rate slow enough to form a gel having a substantially homogeneous appearance to the naked eye. In other words, no fiber masses, lumps, or nodules should be observable in the gel as it is being formed, and if the gel begins to appear lumpy or non-uniform, this is an indication that the dialysis rate is too fast. Further, there should be no precipitation of particles in the chamber containing the procollagen extract, but instead a gel should be formed having substantially the same volume as that of the procollagen extract before gelation.

Various dialysis procedures and techniques can be used, as is well known in the art, although particularly good results are obtained with continuous dialysis employing circulating tap water at a pH below 6.9. The water need not be entirely salt-free, however, nor at a substantially neutral pH, so long as the pH of the water is sufficiently high to cause a pH shift in the procollagen extract converting it to a gel. Usually pH's above 5.0 are satisfactory. In this step it is also desirable to employ temperatures around 5 to 10° C., although higher temperatures up to 25° C. may be used in some cases. A substantially isotropic gel can usually be formed in this way in from 6 to 24 hours.

After the formation of the isotropic gel, it is also important that the gel be aged to increase its cohesive strength. This can be done most readily by allowing the gel to stand in contact with water, or by continuing the dialysis. At least 12 and preferably 24 hours should be allowed for aging, during which time the cohesive strength of the gel will increase markedly, providing it is substantially homogeneous. The cohesive strength will also continue to increase for an additional period of time if the gel is allowed to stand in contact with water, but the maximum cohesive strength will usually be reached in about 48 hours, and it is undesirable to age the gel for more than one week. The temperature of the water during this aging step should also be below 25° C. and preferably in the range from 5 to 10° C.

As a final step, the aged gel is subjected to an orienting stress while exuding water therefrom. Since a typical gel contains about 2000 grams of occluded water per gram of procollagen, the material will undergo a large amount of shrinkage during this step. In fact the final material may contain only about 10% moisture. The type of orienting stress applied will depend on whether it is desired to form the material into filaments or sheets. For example, sheets can be formed by applying compressive forces to the gel and thereby flattening the gel into a sheet as the water is expelled therefrom. Similarly, an elongated or tubular gel body can be formed into a filament by subjecting the gel body to tension along its longitudinal axis. It will be understood, of course, that the gel body should originally be formed in accordance with the desired end product, and this can be done very readily since the gel will form in the same shape and occupy the same volume as the procollagen extract.

Procollagen material prepared as described above is characterized by high wet strength. Such procollagen material also exhibits other properties which make it desirable for various applications. For example, filaments prepared in this manner are readily knottable when wet, and can be produced in any desired length. Further, the procollagen material exhibits a reversible syneresis. A dried filament or sheet may be thoroughly rewetted in water, and then additional water can be pumped into the material to completely reconstitute the original firm gel. Moreover, as long as restraining pressure is kept on the gel, it will retain its swollen form. When this pressure is abated, the gel will exude water and become flaccid.

If desired, the procollagen material can be tanned during the process of gelation, and this way pretanned procollagen material can be produced. Specifically, a soluble tanning agent can be introduced into the dialysis water during at least a portion of the dialysis, and in this way can be introduced into the gel as as it is being formed. Any of the usual tanning agents can be for this purpose, such as vegetable tanning agents, chrome tanning agents, etc.

The method of this invention is not limited to the preparation of material formed entirely of procollagen, but is also applicable to preparing material containing both collagen and procollagen. It has been found that a material having substantially the same properties as that already described can be produced by including dispersed collagen in the aqueous acid solution of procollagen prior to gelation. For example, the collagen residue after the extraction of procollagen as described herein can be dispersed in an aqueous acid solution similar to that employed for the extraction of procollagen. When the collagen fibers are uniformly dispersed in the procollagen solution, a substantially homogeneous gel can be obtained, and the collagen filaments appear to increase the cohesive strength of the gel, as well as the wet strength of the final product.

This invention is further illustrated by the following specific examples:

*Example I*

The hide of a freshly slaughtered steer was immediately chilled in ice water. The hide was then cut into small strips which were washed with cold water. When clean, the strips were frozen on Dry Ice and run through a hide splitter. The hair layer was split off below the follicle level, and the untrimmed bits of flesh were also split off the other side of the hide. The hide pieces were rewashed with cold water and refrozen. The cleaned corium layer can be stored indefinitely when frozen.

The frozen pieces were thawed in cold 10% sodium chloride solution and washed with the cold sodium chloride solution until the supernatant liquid was clear and free from proteinaceous material. The salt was washed out with cold water, and this water was decanted. The hide pieces were next extracted with several portions of ether. The ether was beaten through the hide pieces by vigorous pounding. The hides were washed in cold water until all the ether was removed. They were then swollen in a 0.1 ionic strength, pH 3.4, citric acid-sodium dihydrogen phosphate buffer at 10° C. or lower. The supernatant from this extraction contained the procollagen. This solution was cleared by centrifugation in a Sharples super-centrifuge operating at 30,000 to 40,000 R. P. M. The final solution will have a maximum procollagen content of 0.5% by weight. It is important that the temperature is kept below room temperature throughout the entire process.

A 0.2% solution of the procollagen, in pH 2.5, 0.1 ionic strength, citrate-phosphate buffer was poured into a Visking sausage casing dialysis bag $^{3}\!/_{32}''$ in diameter and 50" in length. The bag was filled to exactly 48" with the solution and suspended in a long glass tube. Cold tap water was flushed upwards through the tube. Within three hours the solution in the bag became turbid and within five hours the gel had set. The dialysis was continued for two days. The cellophane casing bag was next laid out on a long strip of several thicknesses of filter paper on a long tilted board. Both ends of the bag were cut off and the gel allowed to drain. The diameter of the gel decreased as water was exuded but the length was unchanged. As soon as practical the dialysis bag was slit longitudinally and one end of the semi-limp gel was grasped in a clamp. The gel was picked up by this clamp and hung vertically. The weight of the gel acted to supply an orienting stress to the whole system. The gel diameter continued to decrease as water was exuded, but the length remained constant. As the total weight of the gel decreased, weights were hung on the bottom of the gel to keep it stretched. A 1 kg. weight was the final weight used. When dry, the filament was approximately 0.008" in diameter and 48" in length. This fiber had a working average tensile strength of 60 kg./mm.$^2$ when dry. It stretched approximately 10% before breaking in a standard suture test apparatus.

*Example II*

A dialysis bag filled with 0.2% procollagen solution was immersed in a tank containing a 1.5% solution of a commercial vegetable tannin at pH 3.0. The tannin dialyzed into the bag and precipitated the procollagen as a tanned network gel. After 24 hours, the protein was dialyzed for an additional 24 hours against cold tap water to raise the pH and remove the buffer salts. The tanned gel was dried as described in Example I. A tanned fiber resulted which, when oiled with a commercial leather stuffing agent (Du Pont sulphonated olive oil), was flexible and water-resistant and had the tensile strength of the untanned filament of Example I.

*Example III*

A 0.2% solution of procollagen was mixed with a 0.2% dispersion of collagen fibrils (prepared in a Waring blender) in the same pH 2.5, 0.1 ionic strength citrate-phosphate buffer solution. This mixture was dialyzed exactly as described in Example 1. The gel which set was more turbid than that obtained upon the dialysis of procollagen alone, but still appeared isotropic and homogeneous to the naked eye. The dried fiber had the same physical appearance as the fiber of Example I but had 10% higher tensile strength. By varying the proportions of collagen and procollagen, one could probably increase the utility of this process. Evidence that even the dispersed collagen fibrils are oriented in the filament is given by the intense optical birefringence of the filament.

Example IV

A procollagen gel prepared as in Example I was dried by pressing out the water between sheets of filter paper. A dry translucent sheet was obtained whose width and length were that of the original gel. There is no difficuty in stripping the sheet procollagen from the filter paper as the sheets have high wet strength. They may be dried as sheets in air. Strong multifilament thread may be made from the wet sheets by winding several such sheets, laying flat against each other, into threads and then allowing the wet filament to dry under tension. These threads are stronger than the monofilaments of Example I.

Example V

A procollagen gel, prepared as in Example I, was dried to a filament. The filament was soaked in water until it became thoroughly wetted and water was then mechanically pumped into the filament through a series of fine hypodermic needles. The original gel was reconstituted. When the reconstituted gel was allowed to dry, it behaved exactly as it did originally. Partially limp gels may thus be used as inflatable wedges to separate tissues, etc. As long as pressure is maintained on the gel, water is not exuded. When the restraining pressure is released, the gels will become flaccid.

While in the foregoing specification this invention has been described in considerable detail in relation to specific embodiments thereof, it will be apparent to those skilled in the art that the invention is susceptible to other embodiments and that many of the details set forth herein can be varied widely without departing from the basic concepts of the invention.

We claim:

1. The method of producing a material of relatively high wet strength from procollagen, comprising converting an aqueous acid solution of procollagen to a gel by dialyzing said solution against water, said dialysis being carried out at a rate slow enough to form a gel having a substantially homogeneous appearance to the naked eye, aging the homogeneous gel in water to increase its cohesive strength, and then applying stress with a directional orientation to the aged gel while exuding water therefrom.

2. The method of claim 1 in which said dialysis water contains a tanning agent during at least a portion of the dialysis to produce a pretanned procollagen material.

3. The method of producing a sheet of relatively high wet strength from procollagen, comprising converting an aqueous acid solution of procollagen to a gel by dialyzing said solution against water, said dialysis being carried out at a rate slow enough to form a gel having a substantially homogeneous appearance to the naked eye, aging the homogeneous gel in water to increase its cohesive strength, and then compressing said gel into a sheet while exuding water therefrom.

4. The method of claim 3 in which said dialysis water contains a tanning agent during at least a portion of the dialysis to produce a pretanned procollagen material.

5. The method of producing a filament of relatively high wet strength from procollagen, comprising converting a tubular portion of an aqueous acid solution of procollagen to a tubular gel body by dialyzing said solution against water, said dialysis being carried out at a rate slow enough to form a gel having a substantially homogeneous appearance to the naked eye, aging the tubular gel body thus obtained to increase its cohesive strength, and then subjecting the aged tubular gel body to tension along its longitudinal axis while exuding water therefrom to form a filament.

6. The method of claim 5 in which said dialysis water contains a tanning agent during at least a portion of the dialysis to produce a pretanned procollagen material.

7. The method of producing a material of relatively high wet strength from procollagen and collagen, comprising forming an aqueous acid solution of procollagen containing dispersed collagen fibers, converting said solution to a gel by dialyzing said solution against water, said dialysis being carried out at a rate slow enough to form a gel having a substantially homogeneous appearance to the naked eye, aging the honogeneous gel in water to increase its cohesive strength, and then applying stress with a directional orientation to the aged gel while exuding water therefrom.

References Cited in the file of this patent

UNITED STATES PATENTS

| | | |
|---|---|---|
| 2,058,835 | Schulte | Oct. 27, 1936 |
| 2,338,787 | Ushakoff | Jan. 11, 1944 |
| 2,389,292 | Bjorksten | Nov. 20, 1945 |
| 2,485,958 | Cresswell | Oct. 25, 1949 |

OTHER REFERENCES

Mitchel: A Textbook of Biochemistry, McGraw-Hill, 1946, page 107.